Jan. 27, 1970     H. J. FEIGEL     3,491,657
CONTAINER CLOSING DEVICE

Filed April 4, 1966     9 Sheets-Sheet 1

INVENTOR.
HAROLD J. FEIGEL
BY
McGlew & Toren
ATTORNEYS.

Jan. 27, 1970 H. J. FEIGEL 3,491,657
CONTAINER CLOSING DEVICE
Filed April 4, 1966 9 Sheets-Sheet 3

INVENTOR.
HAROLD J. FEIGEL
BY
McGlew & Toren
ATTORNEYS.

Jan. 27, 1970

H. J. FEIGEL 3,491,657

CONTAINER CLOSING DEVICE

Filed April 4, 1966

INVENTOR.
HAROLD J. FEIGEL

BY
McGlew & Toren
ATTORNEYS

Jan. 27, 1970  H. J. FEIGEL  3,491,657
CONTAINER CLOSING DEVICE
Filed April 4, 1966  9 Sheets-Sheet 5

INVENTOR.
HAROLD J. FEIGEL
BY
McGlew & Toren
ATTORNEYS.

FIG. 17

United States Patent Office 3,491,657
Patented Jan. 27, 1970

3,491,657
CONTAINER CLOSING DEVICE
Harold J. Feigel, West Englewood, N.J., assignor to
Closure Corporation, Linden, N.J.
Filed Apr. 4, 1966, Ser. No. 539,771
Int. Cl. B31b 1/64, 15/26
U.S. Cl. 93—36.9     8 Claims

ABSTRACT OF THE DISCLOSURE

A method of applying a sealing tape to a container comprises feeding the container along a horizontal feed path such that the weight of the container bears downwardly on the feed tape and projecting a length of sealing tape upwardly through the feed path in front of the container. The projected tape is then pressed against the forward edge of the container, and the container is thereafter moved beyond the intersection of the tape feed with the conveyor path to cause the container to move over the tape and to press the tape onto the bottom wall of the container and to pull the tape along the bottom as the container is continuously moved.

An apparatus for carrying out the method includes a roller conveyor having a plurality of rollers arranged in a horizontal path over which the container is moved. The roller conveyor includes a cut out portion in the central area which accommodates the tape feeding mechanism and permits the tape to be fed upwardly through the horizontal roller conveyor path over which the container is moved. The container may be taped by moving the container beyond the initial contact with the tape on the roller conveyor due to the weight of the container bearing downwardly on the tape. The construction advantageously includes side belt conveyors which engage each side of the container and properly guide it and hold it as the bottom is being tape closed.

SUMMARY OF THE INVENTION

This invention relates in general to container closing devices and to a method of closing a container, and in particular to a new and useful device which includes means over which the container is conveyed while sealing tape is dispensed and applied over a portion of the sides and the bottom of the container which is being conveyed, and to a method of closing a container by applying tape over the bottom thereof as the container is moved over a roller conveyor.

Many methods and devices are known for closing containers of a type which include foldable top and/or bottom flaps which are arranged to either overlap or to substantially abut in the center of the container. Most such devices must be operated either completely manually or semi-automatically and the sealing tape is usually applied over the top of the container as the sides are supported on a table or conveying device.

The present invention is an improvement over the prior art inasmuch as it provides means for conveying and for automatically applying a sealing tape to a container which is moved over the conveyor and to an improved method of sealing a container by applying the tape across the bottom as it is being fed. In accordance with the invention, there is provided a conveyor which advantageously comprises a plurality of rollers over which the conveyor is moved. A sealing tape feeding mechanism is located in a position to feed tape upwardly between two adjacent rollers in order to apply tape over a portion of the forward edge and across the bottom and a portion of the trailing edge of the container as the container is advanced over the conveyor.

The arrangement is such that the weight of the container moving along the conveyor actuates a tape feeding mechanism and in addition the roller mechanism for applying and pressing a tape onto the forward edge, bottom, and trailing edge of the container as it is moved. In addition, the device advantageously includes means such as side conveyors which engage opposite sides of the container on the roller conveyor and advance it into engagement with presser elements as the tape is dragged along by the container.

The conveyor and tape sealing device of the invention advantageously includes means for insuring proper operation of the side conveyor elements which engage the conveyor and for providing a safety feature when there is no container on the conveyor to insure that the side feeding elements do not move inwardly beyond a certain point. In addition, the roller elements of the conveyor over which the container is moved include switching means for initiating the pre-feed of the sealing tape into the path of the container and the cutting of the sealing tape after a predetermined length is pre-fed. The container drags the pre-fed tape along as it is moved into engagement with pressing rollers for applying the sealing tape to the container as it is moved through a zone in which the rollers are operative.

A feature of the operation is that the tape is pre-fed to project into the path of the container and the container drag feeds the selected length of tape. To facilitate this action, a lightly biased arm overlies the tape and moves with the tape to permit initial easy feed-off of the tape initially as it is secured to the forward edge of the container.

Accordingly, it is an object of the invention to provide a method of sealing a container which comprises moving the container over a conveyor and applying tape to at least the bottom thereof as it is moved.

A further object of the invention is to provide a device for sealing a container which includes a conveyor over which the container is moved with tape feeding means associated with the conveyor to pre-feed the tape to the conveyor and to permit easy pull off of the tape as the container is being moved on the conveyor.

A further object of the invention is to provide a roller conveyor and container sealing device which comprises a plurality of rollers over which the container is movable with means actuated by the movement of the container on the rollers and to initiate the feeding of a pre-selected length of sealing tape and to project an end of the tape through the path of movement of the container, and with further means actuated by the movement of the container on said rollers to apply the tape preferably to a portion of the forward wall and bottom wall and a portion of the trailing wall as the container is being moved.

A further object of the invention is to provide an improved tape feeding mechanism with a safety mechanism to accommodate rapid tape feed-out and feed stoppage.

A further object of the invention is to provide a tape sealing device which includes an easy disconect mounting for the knife.

A further object of the invention is to provide a container closure device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Referring to the drawings in particular, the invention as embodied therein comprises a container closure device for a container-conveying and sealing tape-applying device generally designated 10, which includes a roller conveyor generally designated A, side belt conveyors B and C arranged adjacent each side of the roller conveyor A but being movable inwardly and outwardly for the purpose of gripping a container moved thereon, a tape pressing or applying mechanism generally designated D, and a tape pre-feed mechanism E (FIG. 5) for projecting a length of tape into the path of container movement.

In accordance with the invention, a container 12 may be delivered to or placed upon the rollers 14 of the roller conveyor A and thereafter the belt conveyors B and C are moved inwardly to cause driving engagement of the vertically disposed belt 16 with the sides 12l and 12r of the container and move it at a fixed speed toward the tape feeding and applying mechanism D. As the container 12 is moved, a pre-selected length of sealing tape 18 is fed by the feeding mechanism E (see FIG. 5).

The pressing or applicating mechanism D includes roller sets 20 and 22 which are pivotally mounted on a frame or bar (see FIGS. 2–2d and FIG. 16) and which perform the operation of pressing the tape 18 onto the container 12 to insure that the tape is firmly adhered thereto.

Figure 1:
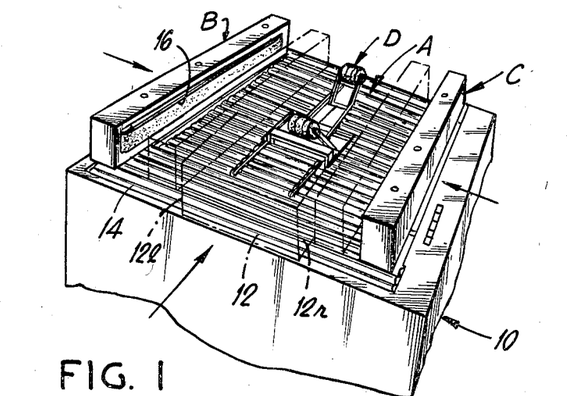
FIG. 1 is a top right-hand perspective view of a container closure device constructed in accordance with the invention.
Figure 2:
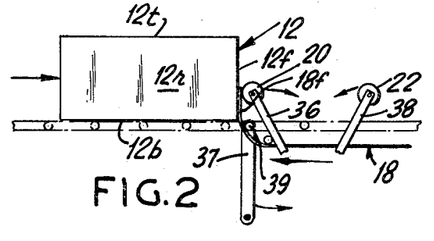
FIG. 2 is a somewhat schematic partial elevational view indicating the position of the container when the first portion of the tape is pressed over the forward edge thereof.
Figure 2A:
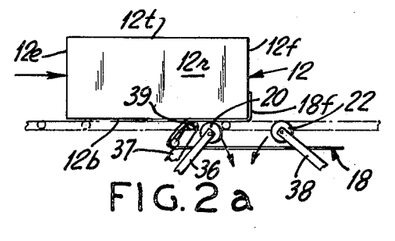
FIGS. 2a to 2d are views similar to FIG. 2 but showing the sequence of operation of the tape applying mechanism as the container is moved over the conveyor.
Figure 3:
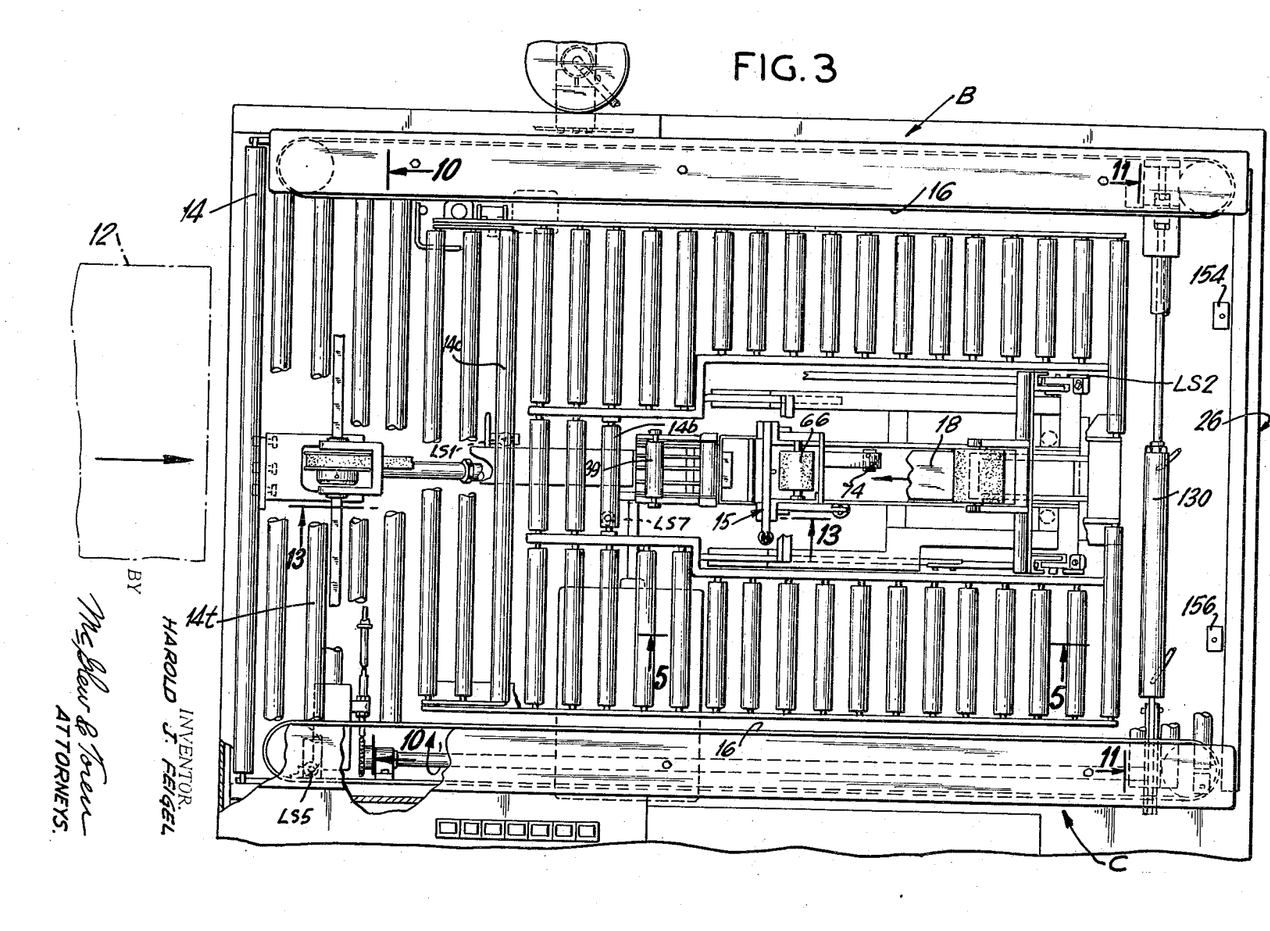
FIG. 3 is a top plan view, partly in section, of the container closing device.
Figure 4:
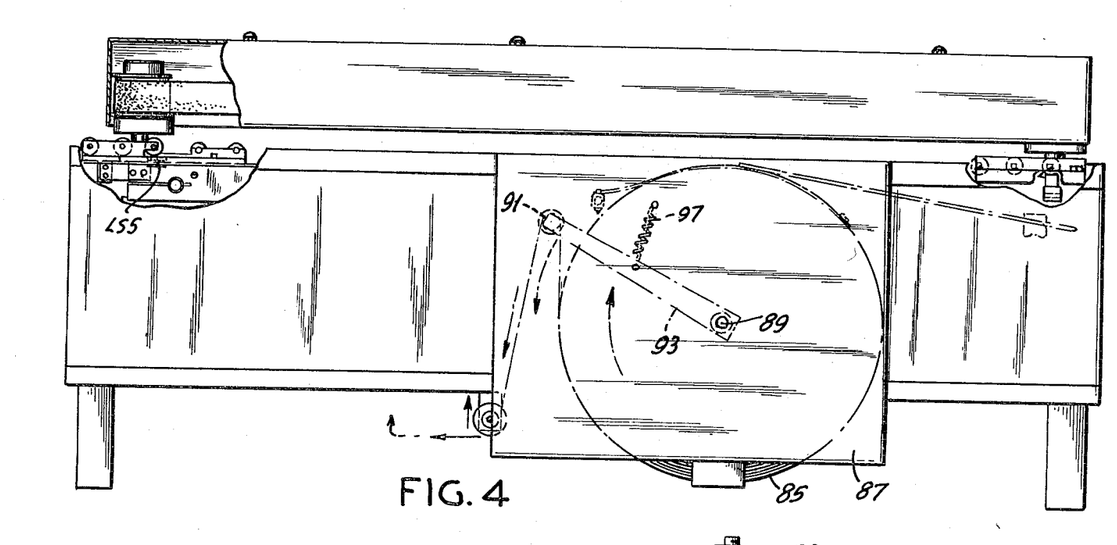
FIG. 4 is a partial side elevational view and sectional view of the conveyor indicated in FIG. 1.
Figure 9:
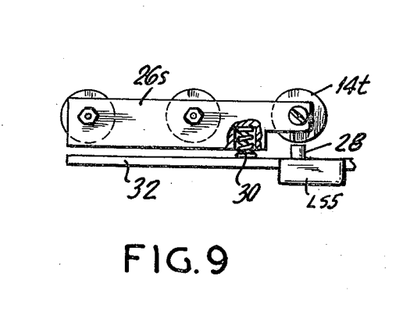
FIG. 9 is an enlarged partial elevational view indicating the actuating means for one of the control switches which is actuated by the movement of the container over the rollers.

As seen best in FIGS. 1, 2 and 3, a container 12 which is delivered onto the rollers 14 will be moved therealong until it contacts, for example, the third roller 14t. All of the rollers 14 are rotatably mounted in a conveyor frame generally designated 26 and the third roller 14t is supported on at least one side adjacent a limit switch, for example limit switch 5 as indicated in FIGS. 4 and 9. As best shown in FIG. 9, a side frame member 26 supports roller 14t in a manner such that it overhangs an actuating button 28 of a limit switch designated LS5. The frame 26 is supported adjacent the roller 14t on a spring 30 which rests on a side frame member 32. The movement of the container over roller 14t causes its downward movement to actuate limit switch LS5. The actuation of the LS5 in the embodiment illustrated causes the pre-feeding of the tape 18 by engaging cooperating feed rollers (FIG. 5) one of which is constantly driven by a driving motor (not shown) having a motor shaft 34 (see FIG. 13).

The movement of the container 12 on the rollers 14 thereafter causes actuation of another limit switch, for example LS1 as indicated in FIG. 3, by the downward depression of the roller 14c in order to cause the inward movement of the side conveyors B and C to cause the driving belts 16 to engage the container sidewalls 12r and 12l. The belts 16, 16 are driven at a uniform pre-determined speed and the conveyor 12 arrives at the station indicated in FIG. 2 just after a forward end 18f of the tape is fed above the top of the conveyor rollers, so that the forward wall 12f of the container contacts the portion of the tape 18f (see FIG. 2). The conveyors B and C continue to move the container 12 until it arrives at the station indicated in FIG. 2a. At that location, the tape presser control arms or presser arms 36 and 38 which carry the respective rollers 20 and 22 are moved by the forward movement of the container 12 in the direction of the arrows indicated in FIGS. 2 and 2a. This causes the presser roller 20 to be moved first downwardly along the front wall 12f and then along the bottom wall 12t of the container 12.

To facilitate easy initial feed of the tape 18, the tape is lightly biased against a guide adjacent the plane of the top of the rollers 14 by an arm 37 having a roller 39 (FIGS. 2a and 8) under the force of a light spring 41 secured between the arm 37 and a fixed member 43. After contact of the tape forward end 18f with the container front wall 12f, the tape may be easily pulled along since the arm 37 may be displaced to the right as the container moves in that direction. This permits the tape to easily feed around the forward edge.

Figure 2B:
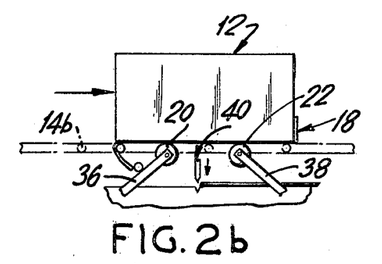

When the container 12 is moved to the position indicated in FIG. 2b, roller 22 has already been moved into engagement with the bottom wall 12t to cause a secondary wiping of the sealing tape 18 onto the container 12, and in the meantime the roller 20 continues to move relatively to the container along its bottom wall 12t.

Figure 2C:
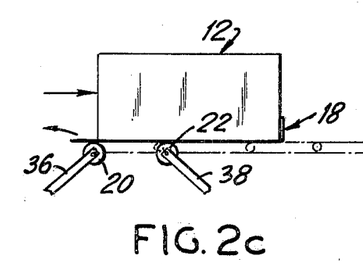

As indicated in FIG. 2c, the container 12 is at a position at which it is close to clearing the roller 20. A cutting knife generally designated 40 of the tape feeding mechanism D severs the length of tape 18 before the pre-fed tape is withdrawn. As indicated in FIG. 3, the back of the carton will roll over a roller 14b to actuate a switch designated LS7 to cause the knife 7 to sever the tape, thereby regulating a length of tape which is fed. The roller 20 continues to press against the container bottom wall until the container 12 moves out of contact therewith (FIG. 2c).

Figure 2D:
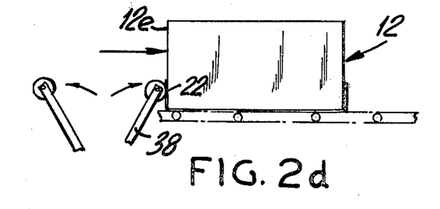

In the position indicated in FIG. 2d, the roller 22 is shown being moved up along the end wall 12e of the container 12 in order to apply the last portion of the tape to this wall.

The tape feeding mechanism generally designated E is shown in the drawing FIG. 3 and also in detail in FIGS. 5 to 8. The shaft 34 (FIGS. 12 to 14) continuously rotates to drive two pulleys 42 and 44 affixed thereto. The pulley 42 drives a pulley 46 which is affixed to a squared shaft 48 (FIGS. 13 and 10) to rotate a driving gear 50 at each end of which is axially slidable along the shaft 48 and is maintained in driving engagement with a gear 52 affixed to a drive shaft 152 having a belt pulley 153 to effect continuous movement of the belt 16.

Figure 5:
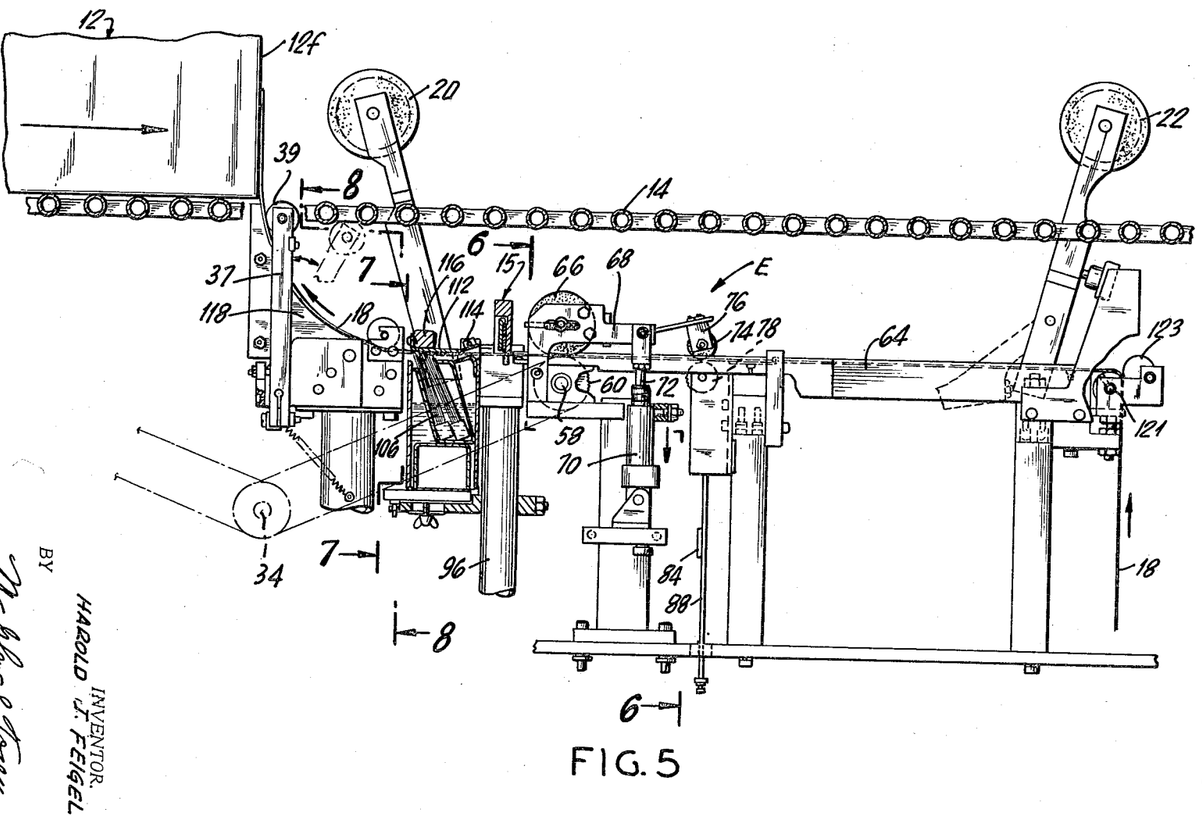
FIG. 5 is a partial sectional view taken along the line 5—5 of FIG. 3.
Figures 12, 13, 14:
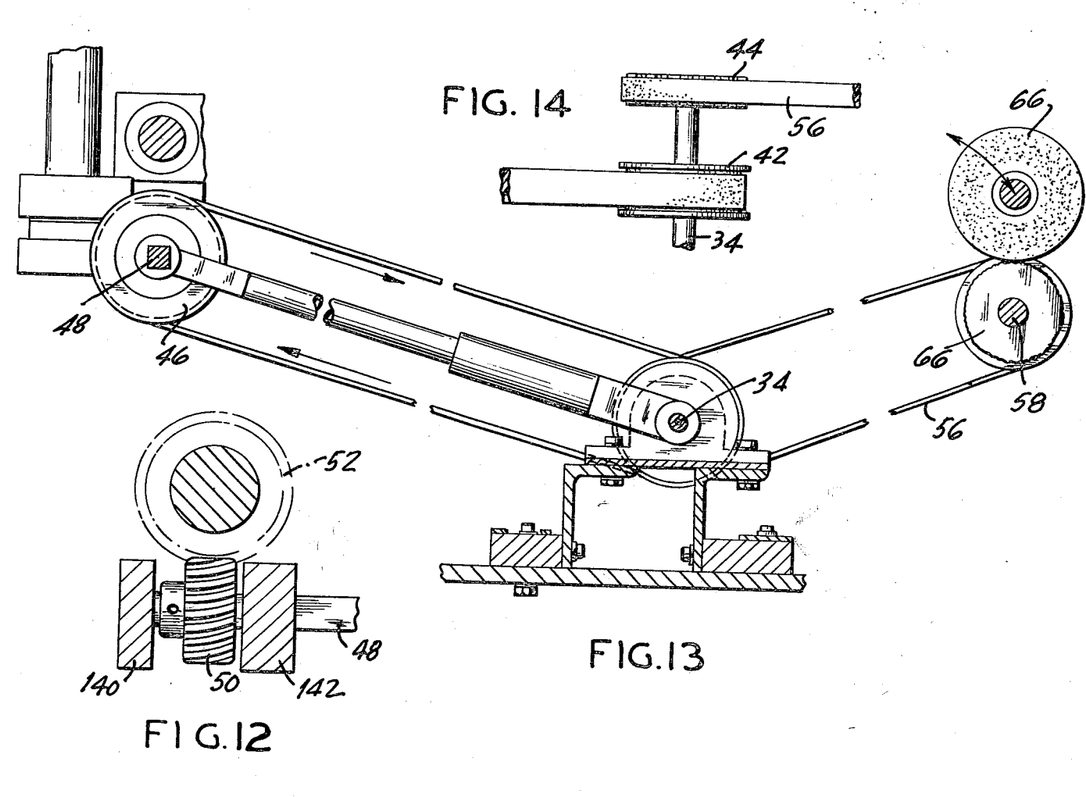
FIG. 12 is a section taken along the line 12—12 of FIG. 10.
FIG. 13 is a section taken along the line 13—13 of FIG. 3.
FIG. 14 is a partial top plan view of the mechanism indicated in FIG. 13.

The pulley 44 drives a pulley 54 through a driving belt 56 as shown in FIGS. 13 and 5. Pulley 54 is carried on a shaft 58 which also carries a knurled feed wheel for the sealing tape 60 (see FIG. 6). The feed wheel 60 projects through a slot 62 defined in a feed table 64 over which the tape is fed. A counter roller 66 is carried on a displaceable arm 68 (FIGS. 5 and 6) which can be moved upwardly and downwardly under the control of a fluid pressure actuated feed cylinder 70 acting through a movable piston and rod 72. The arm 68 also carries an end bearing roller 74 at the end of an extension or bracket member 76. A fixed roller 78 contacts the tape on its underside in vertical alignment with the bearing roller 74. The feeding of the tape is only initiated after the fluid pressure is directed to the cylinder 70 upon actuation of the switch LS5. This causes the counter roller 66 to move downwardly onto the tape 18 and to cause it to be fed by the cooperation of the knurled roller or feed wheel 60.

The feed mechanism E includes a tape feeding timing device which comprises a pulley 80 (FIG. 6) upon which a line 82 is windable when the feed cylinder 70 brings the counter roller 66 to a bearing feed postiion. The line 82 carries a weight 84 at its outer lower end which is confined in a vertical slot 86 of a fixed member 88. As the tape is fed, the line 82 is wound upon the pulley 80, and when it moves upwardly sufficiently, it will contact a roller member 90 to actuate a button 92 of a switch designated 1SX1–t which releases the pressure from the prefeed air cylinder 70 to raise the rollers 66 and 74 upwardly over the tape and to stop the feeding.

A further feature of feeding mechanism E is shown in FIG. 5. The tape is supplied from a large reel 85 which is rotatably mounted on a frame member 87 on a shaft 89. The tape is fed around a roller 91 of a tensioning arm 43 and a guide roller 95 and additional guide rollers (not shown) to the feed table 64. The initial feed of the tape 18 in response to engagement of the feed rollers 66 and 60 is accompanied by movement of arm 93 downwardly against the restoring force of a spring 97 accompanied with only slight rotational movement of the large inertial mass of the reel 85. This insures that the tape does not tear in attempting to rotate the reel 85.

Figures 6, 7, 8:
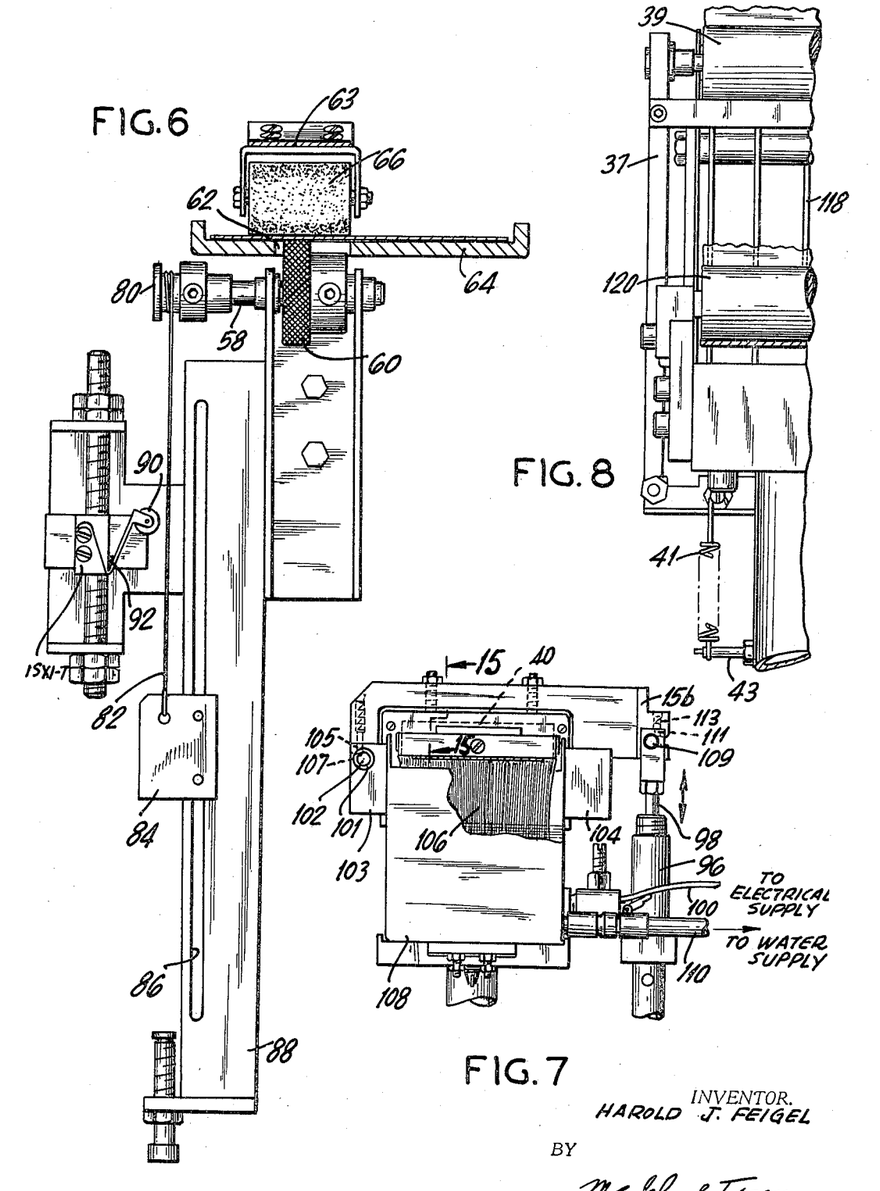
FIG. 6 is a vertical section taken along the line 6—6 of FIG. 5.
FIG. 7 is a partial sectional view taken along the line 7—7 of FIG. 5.
FIG. 8 is a partial sectional view taken along the line 8—8 of FIG. 5.

The tape 18 is fed between a reciprocating knife blade 15 and a fixed counter blade 94 (FIGS. 5 and 7). As mentioned previously, when the back of the container overlies the roller 14b, the switch LS7 will cause actuation of a fluid cylinder 96 which is connected to the movable knife blade 15 to cause it to move downwardly to cut the tape. The knife actuating cylinder 96 includes a piston rod member 98 which is moved therein upon actuation through an impulse delivered to the cylinder 96. An electrical control connection 100 is provided for heating. The member 98 is pivotally connected at its outer end to a cross bar portion 15b of the knife 15. The opposite end of the cross bar member 15b is pivoted at a pivot point or pin 102 on a fixed member 104.

Figure 15:
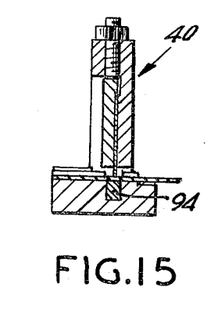
FIG. 15 is an enlarged sectional view of the knife indicated in FIG. 5.

The knife 15 carries pivot pin 102 and it may be snapped into a cylindrical bearing 101 in plate 103 by displacing a downwardly biased pin 105 which blocks the entrance recess 107. In a similar manner, the opposite end of the cross bar portion 15b is engaged over a pivot pin 109 carried on the rod 98. It may be disengaged from the rod by displacing a pin 111 upwardly against its biasing spring 113.

After the tape 18 passes beyond the knife 15, it is moved over a moistening brush 106 which is contained in a liquid reservoir 108 which is supplied with water through a conduit 110 (see FIGS. 5 and 7). A pressure plate 112 is pivotally mounted at 114 above the tape 18 and it carries a weight 116 to cause the plate to bear downwardly on the tape as it moves over the brush 106 to cause its under-gummed side to become moistened by the brush.

After the tape moves beyond the moistening brush 106, it is guided over a guide plate 118 (FIGS. 5 and 8).

The tape is directed under a roller 120 and upwardly in a curve on the guide plate 118 and under the top roller 39 carried on arm 37 and it is delivered above the top of the conveyor rollers 14 of the roller conveyor A. In the embodiment illustrated, the length of tape 18 which is fed is sufficient to cause the tape to be delivered up alongside the front wall 12f of the container, as shown in FIG. 5. The tape 18 is fed from the reel 85 (FIG. 4) and upwardly over a roller 121 (FIG. 5) and past an overlying eccentrically mounted roller 123 which acts as a brake in the event the tape attempts to feed downwardly in a reverse direction. Thereafter it is fed along the top of the table 64.

Figure 11:
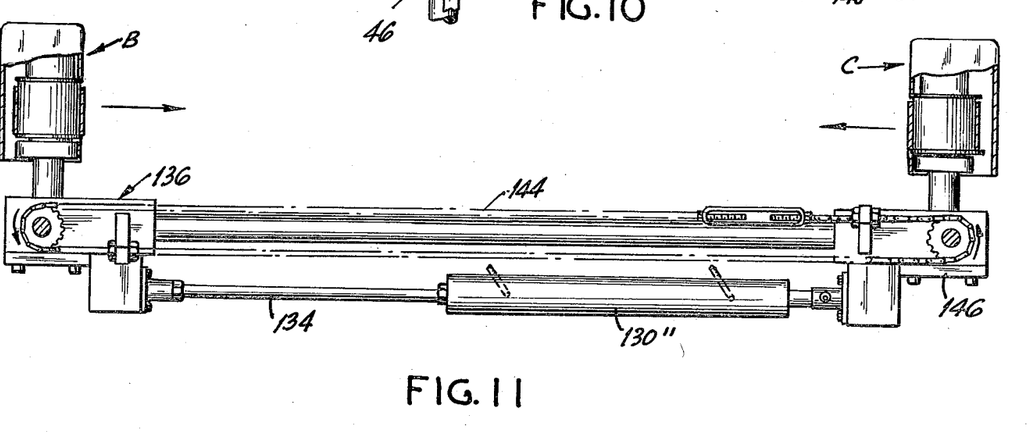
FIG. 11 is a section taken along the line 11—11 of FIG. 3.
Figure 16:
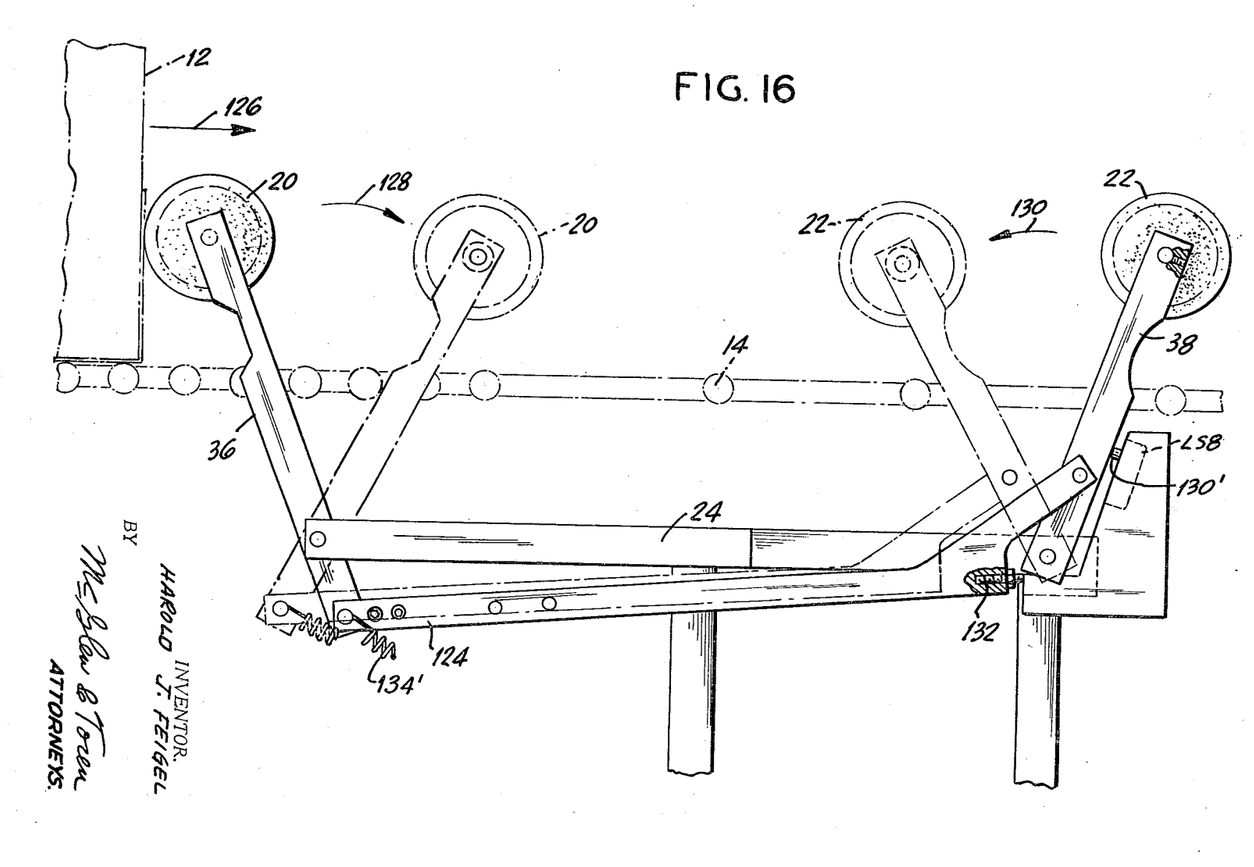
FIG. 16 is a side elevational view of the roller tape applicator mechanism.
Figure 17:
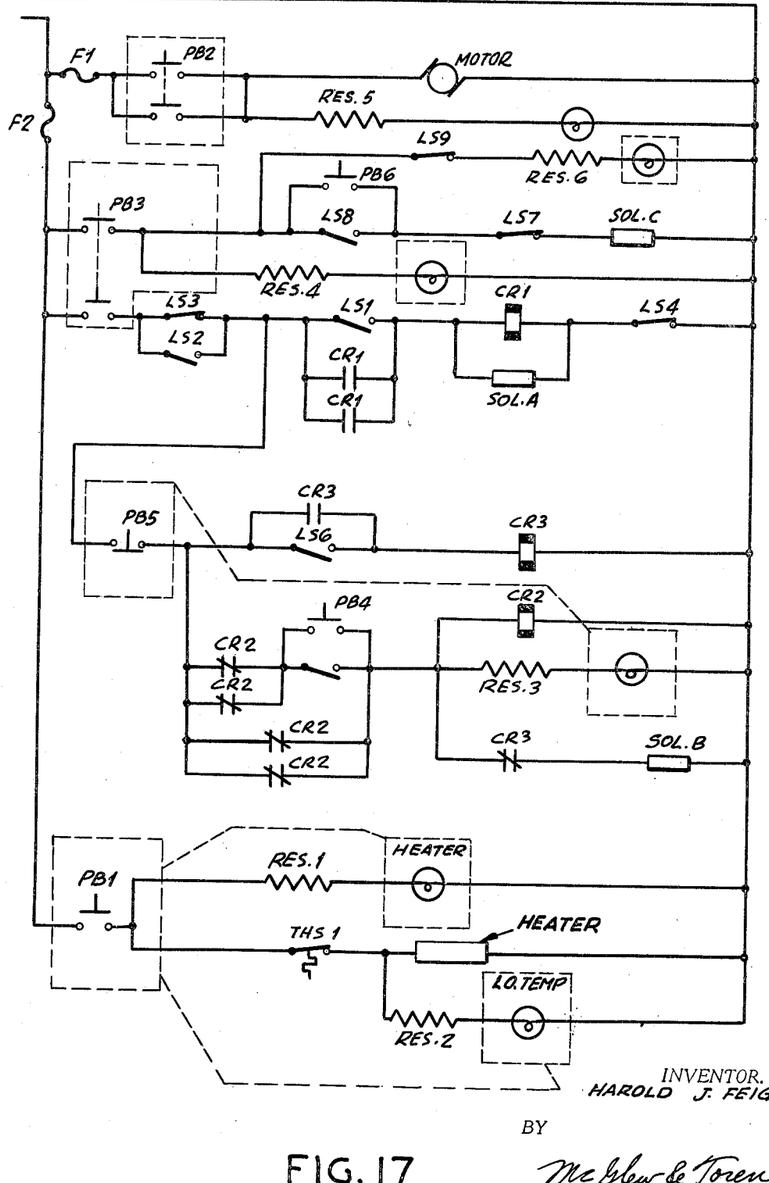
FIG. 17 is a schematic wiring diagram of the electrical operating mechanism.

After the tape is moved upwardly to the position indicated in FIG. 5 and the corresponding position shown in FIG. 2, the container front wall 12f bears against the tape 18 and the roller 20 which is rotatably mounted at the end of the pivotal tape presser control arm 36 (see FIG. 16). The rollers 20 and 22 initially project well above the plane of the top of the rollers 14 of the conveyor A. The presser control arms 36 and 38 are pivoted on the fixed frame 24 and include lower extending portions which are pivoted to a pivot member or link 124. As the container 12 is moved to the right, as indicated in FIG. 16 by the arrow 126, the roller 20 is rotated over the portion of the tape 18f and the arm 36 is rotated clockwise as indicated by the arrow 128. Movement of the presser control arm 36 in a clockwise direction as indicated by the arrow 128 causes the pivot member 124 to shift to the left and to bring the presser control arm 38 in a counterclockwise direction as indicated by the arrow 130. The presser arm 38 bears against the switch LS8 having an actuating button 130' which is actuated upon the shifting of the arm 38 from the solid line position to the dotted line position indicated to cause actuation of switch LS8 in conjunction with LS2 (see FIG. 3) to start the opening movement of the side conveyors B and C. The switches LS2 and LS8 cause the actuation of an operating cylinder 130 (FIG. 11) for effecting such movement. An adjustment member 132 (FIG. 16) permits slight adjustment of the link 124 for variation of the actuation of the switches LS8 and LS2. A spring 134' connected to the link 124 at one side thereof provides the necessary biasing and return means for the link to cause the rollers and the presser control arms 36 to 38 to be moved through the sequence of movement indicated in FIGS. 2a to 2d.

Figure 10:
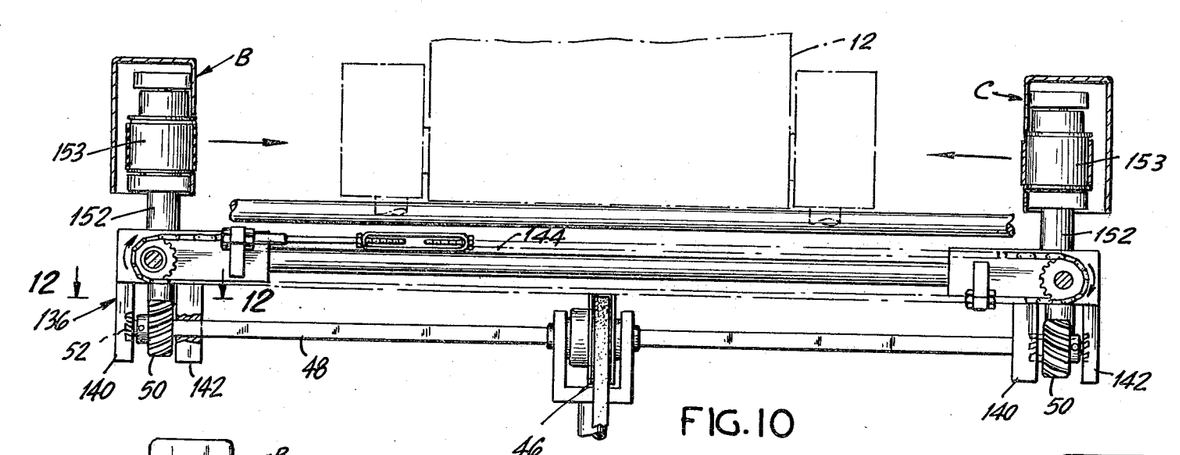
FIG. 10 is a partial elevational and partial sectional view taken along the line 10—10 of FIG. 3.

The drive mechanism and the actuating cylinder for the conveyors B and C are best indicated in reference to FIGS. 10 to 13 inclusive. Fluid may be directed into alternate sides of the cylinder 130" in accordance with the operating procedure outlined previously for causing the inward movement of a piston rod member 134 to cause shifting of a block mounting member generally designated 136 in FIG. 11. The block mounting member 136 includes forked arm portions 140, 142 which embrace a squared shaft 48 on either side of a driving gear member 50. The block member 136 is secured to a chain conveyor 144 which will be moved to the right, as indicated in FIG. 10, to bring the conveyor B inwardly and to cause a corresponding inward movement of the conveyor C which is secured on a block member 146 which is connected to the lower reach of the conveyor 144. During the inward and outward movement of the conveyors B and C, the gear 50 continuously drives a gear 150 affixed to corresponding shafts 152 of each of the conveyors B and C. The arrangement is such that the belts will be driven at the same speed even if they are being moved inwardly so that they will not cock the container as it is fed.

It should be appreciated that the control mechanism is such that the front of the container 12 actuates the switch LS7 as indicated in FIG. 3 to open the switch LS7 and while it is still open, the container is moved to close the switch LS8. This is accomplished through the movement of the arm 38 away from the button 130'. As a result of the opening of LS7 and then the closing of LS8, the circuit is maintained in an open position. This continues as long as a carton is in the machine and riding over the rollers at the location of the switch LS7. When the back of the carton passes the switch LS7, LS7 closes and the knife is actuated and LS8 continues to be held closed by the removal of the presser arm 38.

The switches LS2 and LS3 are hooked up in parallel. When LS2 is closed by the movement away of the presser arm 38, the front of the carton opens LS3. When the carton is passed through the machine, the back thereof causes the opening of switch LS2 by actuating the button 130''. Then the side conveyors B and C are opened, that is, they are moved away from each other. In the meantime, LS3 has been held open by the carton.

Limit switches 154 and 156 are disposed in the path of each of the conveyors B and C to insure that they do not move together beyond a certain distance. If the switch 156 is contacted by the inward movement of the conveyors B and C, the motor driving the inward movement will be operated at a slower speed to cause a cushioning of the inward movement. The limit switch 154 operates upon the closing of the conveyors B and C to prevent infeed when no box is present and the limit switch 156 operates upon the opening thereof to cushion the movement thereof by throttling action of cylinder 130.

Suitable controls are provided for energizing the motor initially and for presetting the machine. Thus, the invention provides a simple machine for effecting the closing of a container and the sealing thereof by conveying it over a conveyor. In the embodiment illustrated, the bottom of the container is closed, and naturally the flaps which are folded inwardly but not sealed are oriented at the bottom in order to effect the application of the sealing tape. In most instances, it would be possible to close the top of a container by merely inverting it on a conveyor 14 as it is moved therealong.

While a specific embodiment of the invention has been shown and described in detail to illustrate the application of the inventive principles, it will be understood that the invention may be embodied otherwise without departing from such principles.

What is claimed is:

1. A device for sealing, with a sealing tape as it is fed, a container having a front wall, bottom and trailing wall, comprising a roller conveyor having a plurality of spaced substantially parallel rollers over which a container may be moved, first and second side conveyors arranged on respective sides of said roller conveyor, means for moving said side conveyors inwardly to engage a container which is positioned on said roller conveyors and to advance the container along said roller conveyors, a sealing tape feeding mechanism located below said rollers, motor means connected to said tape feeding mechanism and said side conveyors to pre-feed a length of tape through a path to intersect the movement of the container by said side conveyors, said tape feeding mechanism including means for guiding the tape through a path to project it between rollers of said roller conveyor at a location ahead of the container being fed, presser means located along the rollers of said roller conveyors including a fixed frame, a first presser member pivoted on said fame and projecting upwardly beyond said rollers in a location to be contacted by the sealing tape which is fed above the plane of the rollers and by the forward edge of the container as it is advanced into contact with the sealing tape, a second presser member pivotal on said frame at a spaced location from the pivot connection of said first presser member to said frame, said first presser member being adapted to engage the forward wall of said container over the sealing tape and then to be guided in pressing engagement along the bottom of said container to press the sealing tape along the bottom, said second presser member being engageable along said bottom after said first member and thereafter being movable into engagement along the trailing wall of said container to press the sealing tape upwardly against said trailing wall, a link pivotally connecting said arm members below said frame, and means biasing said arm members and said link in a direction opposite to the container feed direction to cause said first and second presser members to engage the forward edge of the container as it is fed and to press against the sealing tape and direct it along the bottom of said container as it is advanced, roller feed means for feeding the tape, knife means for separating the tape, and switch actuating means for said roller feed means and said knife means located along said roller conveyor over said roller to actuate said tape feeding means and said knife means in order to predetermine the length of tape which is fed.

2. A device according to claim 1, including a first switch for actuating said roller feed means, a second switch for actuating said knife means, said first switch being located below a roller of said conveyor being actuable upon movement thereover, said second switch being located below a roller spaced from said first roller to actuate said knife operating means at a predetermined time after said roller feed means is actuated.

3. A device according to claim 1, wherein said knife means includes a cross plate mounting a movable knife blade, a pivot plate defining a fixed pivot journal having an entry opening thereto and blocking means biased into the opening, said cross plate having a pivot pin engageable in said pivot journal by displacement of said blocking means.

4. A device according to claim 1, including a means for guiding tape through a curved upward path located beyond said roller feed means up beyond the tops of said rollers of said roller conveyor, and knife means located between said guiding means and said roller feed means effective to cut a length of said sealing tape after it is fed upwardly so that a small portion of the ends thereof projects above said rollers of said roller conveyor.

5. A device according to claim 2, wherein said roller feed means includes a continuously rotating driving roller adapted to engage one side of the sealing tape, and a counter roller, and means for supporting said counter roller to permit displacement thereof toward and away from said driving roller for feeding and discontinuing the feeding of said tape.

6. A device according to claim 1, wherein said side conveyors each comprise an endless belt having a substantially vertical portion extending substantially normal to the axes of the rollers of said roller conveyor, means mounting said side belt conveyors for movement toward and away from each other, including a sliding block member for each conveyor, means for displacing said sliding block member, and a driving gear carried by said sliding block member and being displaceable along its driving shaft, the driving shaft being constructed to permit axial movement of said gear therealong but to prevent relative angular movement so that driving will occur at all positions of said gear along said driving shaft.

7. A device according to claim 6, wherein said means for displacing said sliding block members includes an endless chain connected to a block member of one of said conveyors along the top reach portion and the same chain being connected to the opposite block member along a lower reach portion, and a fluid cylinder and piston means connected to one of said block members to displace said block members and to cause a corresponding displacement of the others of said block members through said connecting chain.

8. A device according to claim 1, wherein said feeding means includes a driving shaft having a driving feed roller thereon and a timing pulley, a cord carried on said timing pulley and being windable thereon during driving operation of said driving shaft, a weight carried by said cord and being liftable by winding of said cord on said pulley, and switch means located in the path of movement of said weight to deactivate said feed means upon winding up of said weight to a predetermined amount.

References Cited

UNITED STATES PATENTS

| | | | |
|---|---|---|---|
| 2,999,342 | 9/1961 | Keely | 53—66 |
| 3,199,262 | 8/1965 | Miller | 53—66 |
| 3,351,185 | 11/1967 | Blumer | 206—60 |
| 3,389,681 | 6/1968 | Krueger | 118—44 |
| 3,404,060 | 10/1968 | Taylor | 156—526 |
| 3,406,084 | 10/1968 | Varga | 161—45 |
| 1,284,583 | 11/1918 | Burgess | 93—41 X |
| 1,751,390 | 3/1930 | Brust | 93—41 X |
| 1,986,633 | 1/1935 | Hearing | 93—56 X |
| 2,052,883 | 9/1936 | Kucklinsky | 93—56 X |
| 2,100,652 | 11/1937 | Shimer | 93—56 X |
| 2,105,953 | 1/1938 | Ouellette. | |
| 2,456,059 | 12/1948 | Grupe | 53—3 X |
| 2,715,861 | 8/1955 | Jacobsen | 93—36.9 X |
| 2,787,941 | 4/1957 | Aldrich. | |
| 2,788,079 | 4/1957 | Allison. | |
| 3,045,402 | 7/1962 | Keely | 93—36.9 X |
| 3,052,072 | 9/1962 | Keely | 93—36.9 X |
| 3,196,591 | 7/1965 | Guido | 53—137 |

FOREIGN PATENTS 519,528  2/1931  Germany.

WAYNE A. MORSE, JR., Primary Examiner

U.S. Cl. X.R.

53—196, 139.3; 93—1, 41, 56